United States Patent
Lim et al.

(10) Patent No.: US 12,443,311 B1
(45) Date of Patent: Oct. 14, 2025

(54) TOUCH SCREEN DISPLAY AND METHOD OF OPERATING THE SAME

(71) Applicant: STMicroelectronics International N.V., Geneva (CH)

(72) Inventors: Hyeok Lim, Incheon (KR); Chan Hyuck Yun, Yongin-si (KR)

(73) Assignee: STMICROELECTRONICS INTERNATIONAL N.V., Geneva (CH)

(*) Notice: Subject to any disclaimer, the term of this patent is extended or adjusted under 35 U.S.C. 154(b) by 0 days.

(21) Appl. No.: 18/777,044

(22) Filed: Jul. 18, 2024

(51) Int. Cl.
  *G06F 3/041* (2006.01)
  *G06F 3/044* (2006.01)

(52) U.S. Cl.
  CPC .... *G06F 3/04182* (2019.05); *G06F 3/041662* (2019.05); *G06F 3/0446* (2019.05)

(58) Field of Classification Search
  CPC ........... G06F 3/04182; G06F 3/041662; G06F 3/0446
  USPC ....................................................... 345/174
  See application file for complete search history.

(56) References Cited

U.S. PATENT DOCUMENTS

| | | | |
|---|---|---|---|
| 8,874,396 B1 | 10/2014 | Olson et al. | |
| 10,338,746 B1 | 7/2019 | Ningrat et al. | |
| 11,816,288 B2 | 11/2023 | Kang et al. | |
| 2013/0106779 A1* | 5/2013 | Company Bosch | G06F 3/04182 345/174 |
| 2013/0257765 A1* | 10/2013 | Lee | G06F 3/041 345/173 |
| 2016/0062494 A1 | 3/2016 | Zuber et al. | |
| 2017/0108993 A1 | 4/2017 | Lee et al. | |
| 2017/0139501 A1 | 5/2017 | Dinu | |
| 2017/0351368 A1 | 12/2017 | Agarwal et al. | |
| 2018/0239493 A1 | 8/2018 | Khazeni et al. | |
| 2019/0079633 A1 | 3/2019 | Kim et al. | |
| 2019/0220142 A1 | 7/2019 | Ningrat et al. | |
| 2020/0278782 A1 | 9/2020 | Chan et al. | |
| 2021/0064165 A1* | 3/2021 | Krah | G06F 3/0443 |
| 2021/0191562 A1 | 6/2021 | Han | |
| 2021/0397341 A1 | 12/2021 | Ye | |
| 2023/0094019 A1 | 3/2023 | Lee | |
| 2023/0333691 A1 | 10/2023 | Kang et al. | |
| 2025/0053261 A1* | 2/2025 | Pedersen | G06F 3/0446 |

* cited by examiner

*Primary Examiner* — Mark Edwards
(74) *Attorney, Agent, or Firm* — Slater Matsil, LLP

(57) ABSTRACT

A method for operating an electronic device comprising simultaneously performing a mutual sampling scan on a first portion of a touchscreen and performing a noise sampling scan on a second portion of the touchscreen that is larger than the first portion, detecting noise values from the second portion of the touchscreen, comparing the noise values to a predetermined frequency value of a touch controller, and adjusting the predetermined frequency value when at least one of the noise values exceed the predetermined frequency value.

20 Claims, 11 Drawing Sheets

TOUCH SCREEN DISPLAY AND METHOD OF OPERATING THE SAME

TECHNICAL FIELD

The present invention relates generally to systems and methods for operating displays and, in particular embodiments, to touchscreen displays.

BACKGROUND

Electronic devices that are designed for user interaction have historically utilized external input devices such as keyboards, key pads, and/or mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications.

Organic light emitting diodes (OLEDs) offer a higher performance display. OLED display provide a high contrast self-illuminating display with a low driving voltage and high luminous efficiency. However, OLED displays come with their own set of advantages and disadvantages.

A display panel of an OLED based touchscreen may include a plurality of pixels arranged in rows and columns across a display layer in a matrix like formation. Each pixel may include an OLED configured to generate light based on the current driven through it. During operation the touch-screen may be refreshed (e.g., updated) in each of a plurality of display frames defined by a vertical synchronization signal (Vsync). During each display frame each row of pixels is updated sequentially and touch sensing scans (e.g., mutual and self-sensing scans) are performed.

A display panel may display an image containing zebra noise. Zebra noise, also known as zebra pattern noise or striped noise, is a type of visual artifact that can occur on touch screen displays. When zebra noise is displayed on a touchscreen, black areas are areas of low voltages on the touchscreen and white areas are areas of high voltages on the touchscreen. The high and low voltages are dense, and have an effect of the capacitance values sensed by the touch-screen, causing additional noise. Each zebra image generates a unique noise frequency that may result in a ghost touch.

SUMMARY

In an embodiment, a method for operating an electronic device includes: simultaneously performing a mutual sampling scan on a first portion of a touchscreen and a noise sampling scan on a second portion of the touchscreen, the second portion being larger than the first portion of the touchscreen, detecting noise values from the second portion of the touchscreen, comparing the noise values to a predetermined frequency value of a touch controller, and adjusting the predetermined frequency value when at least one of the noise values exceed the predetermined frequency value.

In an embodiment, a method for operating an electronic device includes displaying an image on plurality of portions of a touchscreen, the plurality of portions comprising a first portion and a second portion, the second portion being larger than the first portion, performing a mutual sampling scan on the first portion of the display during a first time period by driving a first TX channel, performing a first noise sampling scan to collect noise data on the second portion of the display during the first time period by a plurality of undriven TX channels, determining a first noise frequency from the second portion of the display, and setting a noise frequency threshold based on the first noise frequency.

In an embodiment, a device includes: a display layer having a plurality of pixels, a touch sensing layer adjacent to the display layer, the touch sensing layer having a plurality of sensors, each sensor is associated with one or more of the pixels, a touch controller, and a non-transitory memory storing a program to be executed by the touch controller, the program comprising instructions to: simultaneously perform a mutual sampling scan on a first portion of the display layer and performing a noise sampling scan on a second portion of the display layer, the second portion being larger than the first portion of the display layer, detect noise values from the second portion of the display layer, compare the noise values to a predetermined frequency value of the touch controller, and adjust the predetermined frequency value when at least one of the noise values exceed the predetermined frequency value.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1A:
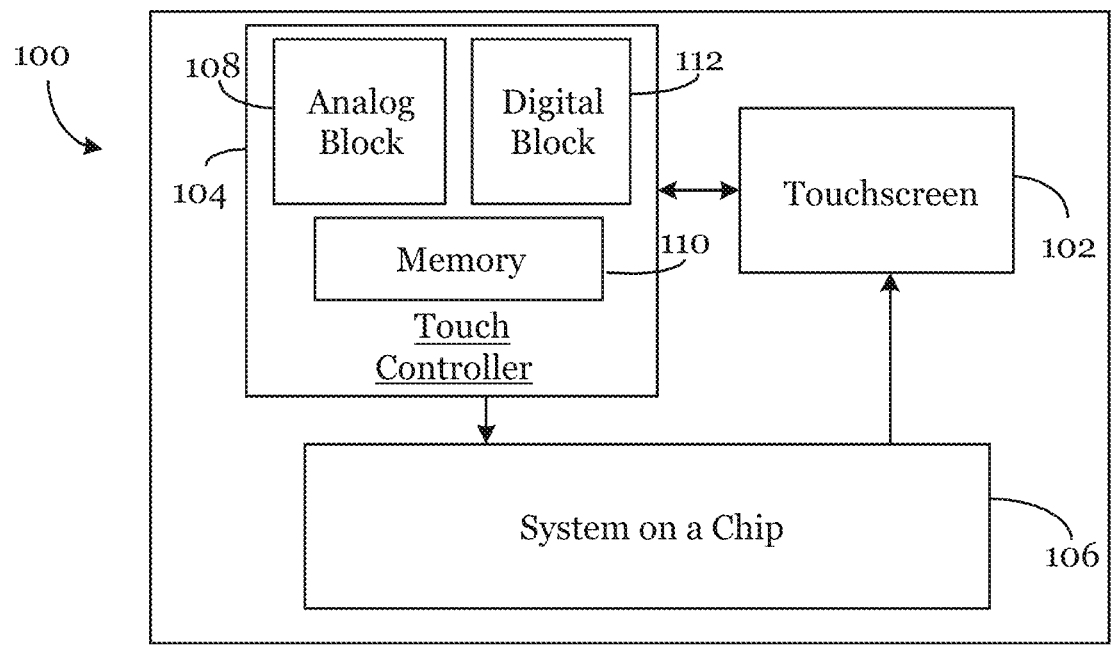
FIG. 1A illustrates a component schematic of the electronic device.

Conventional organic light emitting diode (OLED) devices may include a display that may include a plurality of pixels arranged in rows and columns across a display layer in a matrix like formation. During operation, the OLED display may be refreshed in each of a plurality of frames distinguished by a frequency of vertical synchronization signal (Vsync). The OLED display may be updated by refreshing each row of pixels sequentially from top to bottom of the display in each frame in accordance with a horizontal synchronization signal (Hsync).

A mutual sampling scan is performed on a touchscreen of an OLED display to determine user touch. The sensitivity of the mutual sampling scan depends on various noise sources. When the background noise is high, the sensitivity of mutual sampling will be lower because the touch has to introduce a significant change in mutual capacitance that is above the detection limit. Typically, mutual sampling can be performed over a range of frequencies. However, in practice, the noise data can be different at different scan frequencies used for mutual sampling. The exact frequency with the lowest noise data cannot be determined apriori.

When significant noise is present when the mutual sampling scan is performed, the results of the mutual sampling may detect erroneous touch unless the sensitivity of the mutual sampling is reduced significantly by increasing the detection limit. In other words, a touch on the touchscreen may be detected when nothing is touching the touchscreen. This is known as a ghost touch. During normal operations, when a color image is being displayed on the touchscreen, the horizontal synchronization signal (Hsync) has a strong effect on the display. The typical frequency of noise present on the touchscreen is close to the value of Hsync. When mutual sampling scans used to detect touches made to the touchscreen are performed at the same frequency as the noise of the touchscreen, ghost touches may occur.

Conventionally, to prevent ghost touches when displaying a zebra image (any pattern of black and white), a noise sampling scan may be performed in each of the plurality of frames. Noise sensing scans are usually performed between a self-sensing scan and a mutual sampling scan in each frame. During the noise sampling scan, noise data on the display corresponding to each frequency from a plurality of frequencies is detected. Due to the duration of the frame, the duration of a self-sensing scan, and a duration of the mutual sampling scan, the noise sampling scan is performed for a limited amount of time of the display. Also, because the display is being updated row-by-row, the noise sampling scan is performed on only the portion of the touchscreen that is being updated during the noise sampling scan.

However, zebra (black and white) images on the touchscreen include high voltage areas on the display where white is displayed and low voltage areas on the display where black is being displayed. This contrasting array of voltages is packed within a small area and can cause changes to the capacitances sensed on the touchscreen. In addition, the noise from such zebra images varies with frequency. Therefore, to minimize the noise generated from the zebra image, the frequency with the lowest noise value in the noise sampling scan is selected and the subsequent mutual sampling scan is performed at the selected frequency. This is known as frequency hopping.

However, in some cases, only a portion of the image being displayed contains a zebra pattern. For example, the portion of the display or frame in which the noise sampling scan is being performed may not have a zebra pattern while the rest of the portion being displayed may contain a zebra pattern. In such cases, the noise sampling scan does not detect the zebra pattern and therefore the system is unaware of the associated higher noise. The display may thus select a frequency that is inappropriate for the zebra pattern. Consequently, the noise associated with the zebra pattern, i.e., the zebra pattern noise may cause a false detection and result in ghost touch.

Embodiments relate to dynamic noise sampling for unspecified display noise. Embodiments of the present application disclose a method for performing a mutual sampling scan and noise sampling scan simultaneously to determine noise frequencies on different portions of the display to prevent a ghost touch. In other words, the portion of the display that is scanned during a noise sampling scan changes during each scan, increasing coverage of noise sampling scans across the display.

Figure 1B:
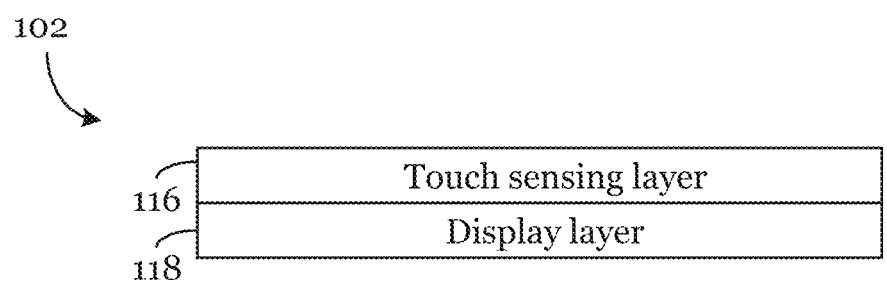
FIG. 1B illustrates a component schematic of a display of the electronic device.
Figure 1C:
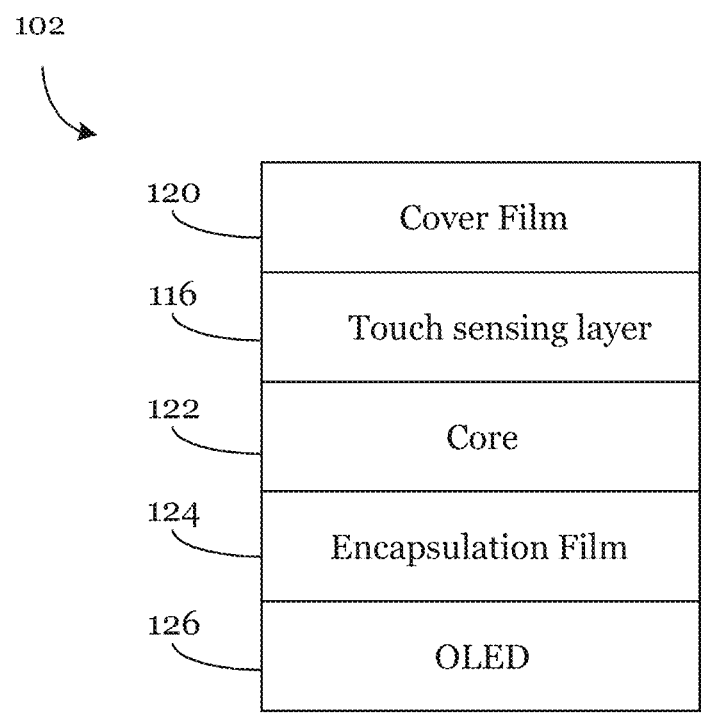
FIG. 1C illustrates a component schematic of a display stack up of the electronic device.
Figure 1D:
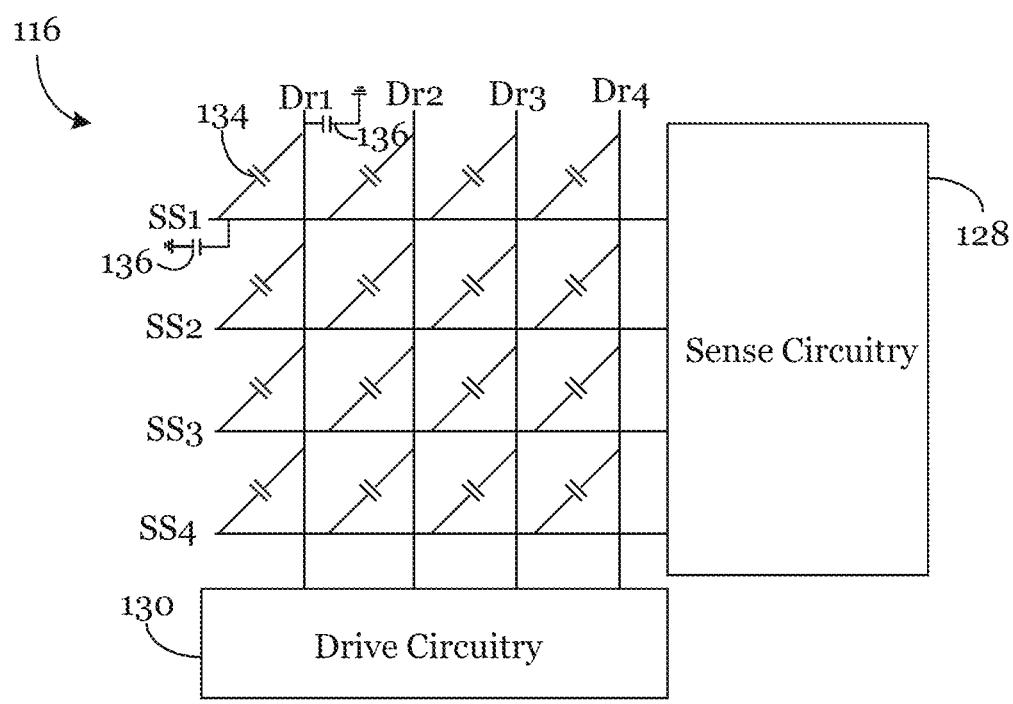
FIG. 1D illustrates a component schematic of a touch-screen of the electronic device.

FIGS. 1A-1D illustrate an electronic device according to an embodiment of the present application, wherein FIG. 1A illustrates a component schematic of the electronic device, FIG. 1B illustrates a component schematic of a display of the electronic device, FIG. 1C illustrates a component schematic of a display stack up of the electronic device, and FIG. 1D illustrates a component schematic of a touchscreen of the electronic device.

Referring to FIG. 1A, an electronic device 100 may include a touchscreen 102, a touch controller 104, and a system on a chip 106. The electronic device 100 may be a smart phone, a GPS device, a tablet computer, a mobile media player, a laptop, a gaming system, a personal computer, or any other electronic device that may utilize touch sensitive display.

The touchscreen 102 may be an organic light emitting diode (OLED) display, an LED display, or any other type of display. The touchscreen 102 may include a plurality of pixels in a display layer configured to display an image. As understood by those with ordinary skill in the art, the display layer of the touchscreen 102 may include of the plurality of pixels positioned at each of the intersections between the data lines and scan lines. The plurality of scan lines may extend across the rows of the touchscreen 102, and data lines that extend across the columns of the touchscreen 102 in a matrix like formation.

The touchscreen 102 may also include a touch sensing layer configured to detect touches made on the touchscreen 102. This will be shown in more detail below.

The touch controller 104 may perform various methods with respect to the display. In various embodiments, the touch controller 104 may be a processor that analyzes information and carries out a series of executable scripts, e.g., stored in a memory 110. In one or more embodiments, the processor may comprise an application-specific integrated circuit (ASIC) device, a central processing unit (CPU), or any other processing unit known in the art. In various embodiments, the touch controller 104 may comprise a number of separate computing units such as cores integrated within one processor, or distinct separate processing chips.

In various embodiments, the touch controller 104 may include an analog block 108 and a digital block 112. The analog block 108 may include a plurality of analog circuits configured to measure capacitances across touchscreen 102 and convert them into digital values. The digital block 112 may comprise a variety of digital logic circuits such as DACs or digital control systems configured to obtain digital touch data from the analog block 108, process the digital touch data and store them into memory 110.

Further details of the operation of the touchscreen 102 and touch controller 104 according to various embodiments are discussed below.

The memory 110 may be programmed for short term and/or long term memory storage. The memory 110 may comprise various programs to be executed in the touch controller 104. The memory 110 may include both volatile and non-volatile memories. The memory 110 is designed to retain information generated by the touch controller 104 so it can be recalled at a later time.

In various embodiments, the system on a chip 106, may also be known as an application processor, and may comprise a processor, interface, circuitry, and/or the like configured to direct the flow of input and output data to the touchscreen 102 and the associated touch controller 104. The system on a chip 106 may be configured to transmit image data and synchronization signals to the touch controller 104. In other words, the system on a chip 106 may be configured to transmit image data corresponding to a plurality of frames on an image.

In various embodiments, the synchronization signals transmitted by the system on a chip 106 may include a horizontal synchronization signal (Hsync) and a vertical synchronization signal (Vsync). The touch controller 104 may receive the image data and transmit processed image data to the pixels on the touchscreen 102 based on Hsync and update the image displayed based on Vsync. In other words, each time Vsync is transmitted, the frame of an image currently being displayed may be refreshed to the next frame of the image.

As understood by those with ordinary skill in the art, the frame of the image being displayed may be refreshed (e.g., updated) in each of a plurality of display frames defined by Vsync. When Vsync is transmitted (i.e., logic high), the frame of the image being displayed may be refreshed. Therefore, the frequency of Vsync distinguishes each of the frames.

During each of the frames, the touch controller 104 may update each row of pixel circuits sequentially in accordance with Hsync. The touch controller 104 may update each row of pixels of the display top-to-bottom in accordance with Hsync is each frame. In other words, a different row of pixels may be updated each time Hsync is transmitted (i.e., is logic high). Therefore, Hsync has a higher frequency than Vsync.

Additionally, the touch controller 104 may be configured to detect touches on the touchscreen 102 via a touchscreen. In other words, the touch controller 104 may be configured to send touch driving signals (TDS) to the touchscreen, receive touch sensing signals (TSS) in return from the touchscreen, process the TSS to determine coordinates of touch, and report them to the system on a chip 106. Then based on the touch data collected from scanning, the touchscreen may be used by the touch controller 104 to determine the coordinates of touch, and report them to the system on a chip 106. Then, the system on a chip 106 may provide an output to the touchscreen 102 based on the reported coordinates of touch.

As understood by those with ordinary skill in the art, when noise is present on the touchscreen 102, when a mutual sampling scan is performed at the same frequency as the noise, the mutual sampling scan may detect a ghost touch on the touchscreen 102.

Noise may be generated on the touchscreen 102 based on the brightness of the colors being generated by each pixel. The brighter the color of a pixel the higher the voltage. In normal operation, when color images are being displayed on the touchscreen, the high frequency of Hsync has a strong effect on the noise on the display. In other words, the frequency of the noise on the touchscreen typically follows Hsync. Therefore, the frequency of the mutual sampling scans can be configured to avoid Hsync.

However, when zebra (black and white) patterns are displayed, an increase in the variation between high voltages in white areas and the low voltages in the black areas generate additional noise. Each zebra image may generate noise on the touchscreen 102 that peaks at a frequency different than the frequency of Hsync and may not be easily avoided by the frequency used in mutual sampling scans.

Conventionally, to avoid performing mutual sampling scans at the frequency at which the noise has a maxima (or generally high), noise sampling scans are performed in each frame. Noise sampling scans are conventionally performed once in each frame along with a self-sensing scan and a mutual sampling scan. In order to have enough time to perform each of the scans, the noise sampling scan is performed during a portion of each frame.

Noise sampling scans are conventionally performed over a plurality of different frequencies. This allows a noise data to be determined for each different frequency. Then the frequency having the lowest noise value may be used as the frequency for performing a mutual sampling scan. This allows the mutual sampling scan to be changed so as to be performed at a different frequency than the frequency of the peak noise caused by the zebra pattern.

Because the touchscreen 102 is being updated row by row, and due to time constraints, a noise sampling scan is generally only performed over a small portion of the touchscreen 102. Conventionally, noise sampling scans are performed at a same start time in each frame and over a same portion of the touchscreen 102.

In instances where the portion of the touchscreen 102 being scanned does not indicate a zebra pattern is being displayed, frequency hopping will not occur. For example, when an image with zebra pattern is being displayed but the portion of the display that is scanned is only a white (or black) portion of the display, the noise data of the image may be miscalculated. In other words, in each noise sampling scan, due to the small noise values generated by the all white (or all black) portion of the image, the touch controller would be misguided to perform the mutual sampling scan at a frequency with a higher noise. This may result in ghost touch.

Advantageously embodiments of the present application disclose a method for changing the portion of the display where the noise sampling scans occurs to prevent a ghost touch. In other words, the portion of the display that is scanned during the noise sampling scan changes over a period of time, increasing the coverage of noise sampling scans.

FIG. 1B illustrates a schematic of the touchscreen 102. In various embodiments, the touchscreen 102 may include a touch sensing layer 116 and a display layer 118. The touch sensing layer 116 and display layer 118 may be situated on the front facing side of the electronic device 100.

FIG. 1C illustrates a display stack-up of the touchscreen 102. The display stack-up of the touchscreen 102 may include a plurality of layers. In various embodiments, the touchscreen 102 may comprise a cover film 120, the touch sensing layer 116, a core 122, an encapsulation film 124, and an OLED layer 126.

The OLED layer 126 may comprise a plurality of OLED elements (e.g., pixels) formed across rows and columns of the touchscreen in a matrix like formation. The OLED elements may be configured to transmit light having a color (such as red, green, or blue) with a brightness based on the current they are driven with to display each of the frames of the image. As described above, the color and brightness displayed by OLED elements are refreshed in display frames according to a vertical synchronization signal (Vsync) and a horizontal synchronization signal (Vsync).

The encapsulation film 124 may be formed and in direct contact with the OLED layer 126. The encapsulation film 124 may function to prevent oxygen, water, or moisture from external sources reaching into and damaging the OLED layer 126. The encapsulation film 124 may comprise one or more layers of material. For example, the encapsulation film 124 may comprise silicon dioxide, silicon nitride, or any other encapsulation films known in the art.

A core 122 may be formed over the encapsulation film 124. The core 122 may be used for controlling the characteristics of the touchscreen 102 such as external light reflection, color accuracy, luminance, and so on. For example, the core 122 may include multiple layers such as a reflection control layer that includes color filters, a lens layer corresponding to each OLED element of the OLED layer, and the like.

The touch sensing layer 116 may be formed over the core 122. The touch sensing layer 116 may be a capacitive touch panel configured to detect touches made to the touchscreen 102. This will be explained in more detail below. Nevertheless, it should be clear that noise generated at the OLED layer 126 can be picked up at the touch sensing layer 116.

The cover film 114 may be a protective layer to protect the touch sensing layer 116. The cover film 114 may comprise a transparent material such as a thin layer of glass including silicon dioxide.

The display stack-up described in FIG. 1C is for example purposes only and is not limited by this application. Additional layers known in the art may also be included in the display stack up of the touchscreen 102.

While discussed herein, with respect to OLEDs, it is understood that other technologies can be utilized. For example, touchscreen displays as disclosed herein can incorporate display technologies such as LED (Light-Emitting Diode), LCD (Liquid Crystal Display), and AMOLED (Active-Matrix Organic Light-Emitting Diode), as well as OLED.

FIG. 1D illustrates a schematic of the touch sensing layer 116. In various embodiments, the touch sensing layer 116 may comprise drive lines Dr1-Dr4 and sense lines SS1-SS4 that span the entirety of the touch sensing layer 116 in a grid-like fashion that are operable by the touch controller 104. In various embodiments, the drive lines Dr1-Dr4 may be formed in rows across the touch sensing layer 116 and the sense lines SS1-SS4 may be formed in columns across the touch sensing layer 116. In other embodiments, the drive lines Dr1-Dr4 may be formed in columns across the touch sensing layer 116 and sense lines SS1-SS4 may be formed in columns across the touch sensing layer 116. In various embodiments, the number of drive lines may be equal to the number of sense lines. Although four drive lines and four sense lines are illustrated in FIG. 1D, this is not indicative of the number of drive and sense lines that may be present on the touch sensing layer. The number of drive and sense lines used are not limited by this application.

The drive lines Dr1-Dr4 and the sense lines SS1-SS4 may overlap in certain embodiments. While FIG. 1D depicts the drive lines Dr1-Dr4 and the sense lines SS1-SS4 overlapping in an orthogonal manner, they may overlap other than orthogonally such as being interleaved or at various angles.

The drive lines Dr1-Dr4 and the sense lines SS1-SS4 may have a measurable mutual capacitance at their intersections as to form a matrix of mutual capacitors with mutual capacitances 134.

In various embodiments, the drive lines Dr1-Dr4 may be coupled to drive circuitry 130 and the sense lines SS1-SS4 may be coupled to sense circuitry 128 of the touch controller 104. As appreciated by those with ordinary skill in the art, each of the drive lines and the sense lines may also have a self-capacitance 136 that is measurable. In other words, the drive lines Dr1-Dr4 and the sense lines SS1-SS4 are operable in mutual sampling mode and a self-sensing mode.

Figure 2A:
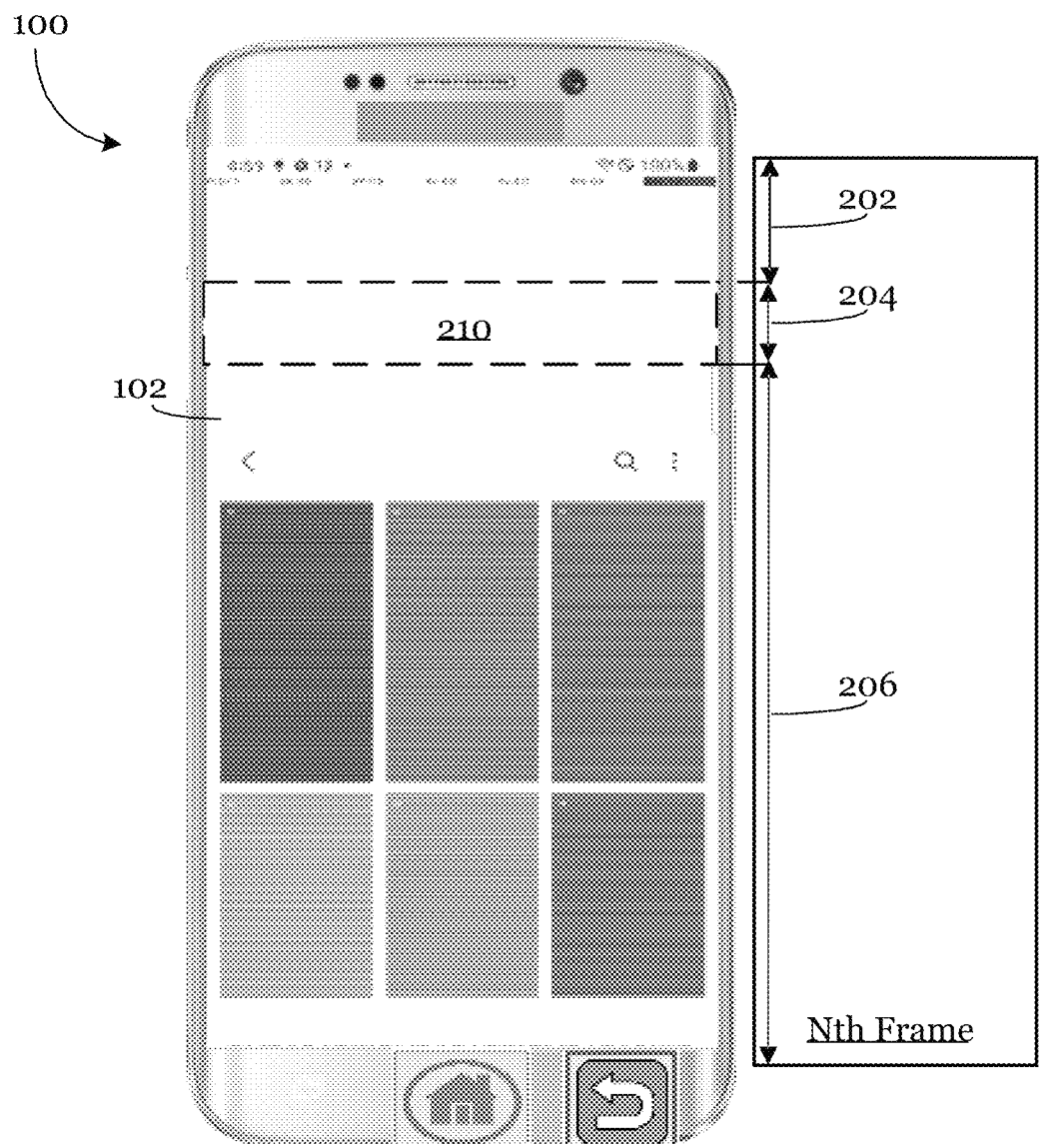
FIG. 2A illustrates a schematic view of a conventional electronic device and sampling scans on the electronic device.
Figure 2B:
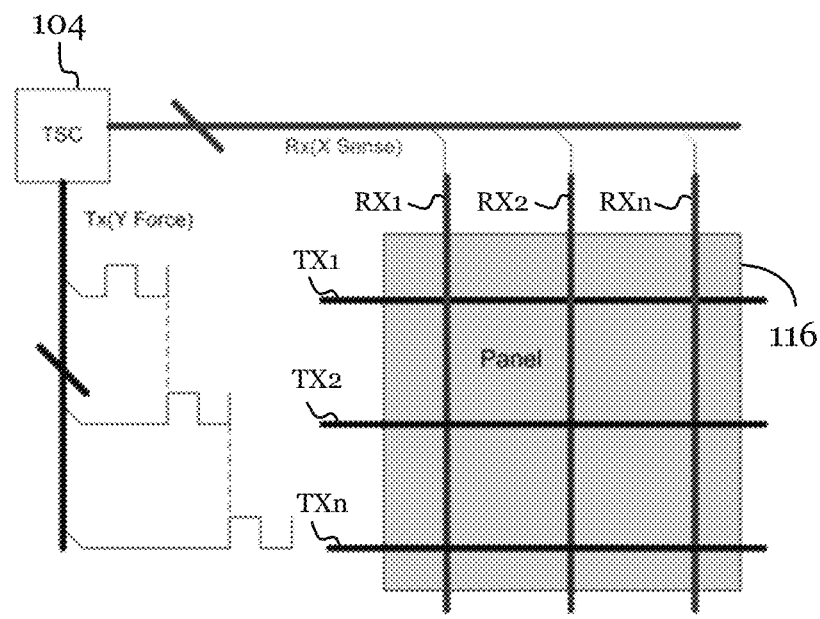
FIG. 2B illustrates a touch sensing layer during a mutual sampling scan.
Figure 2C:
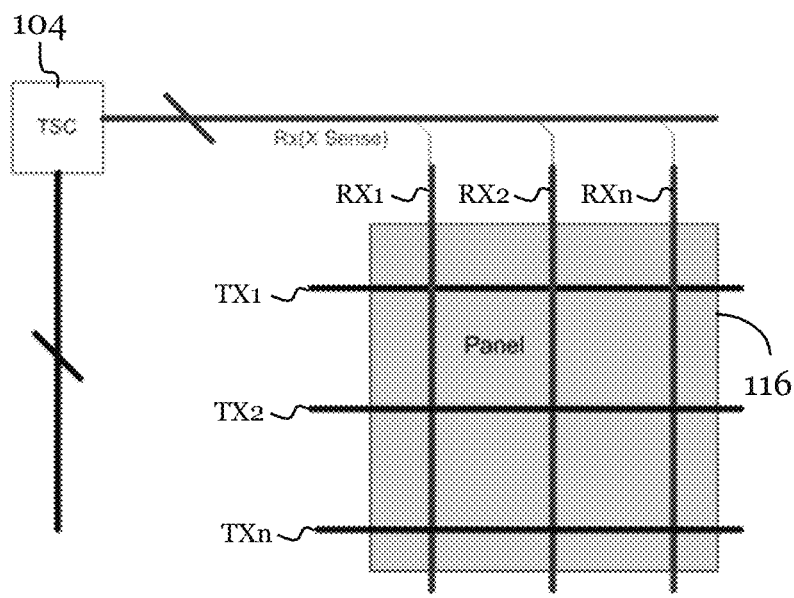
FIG. 2C illustrates a touch sensing layer during a noise sampling scan.
Figure 2D:
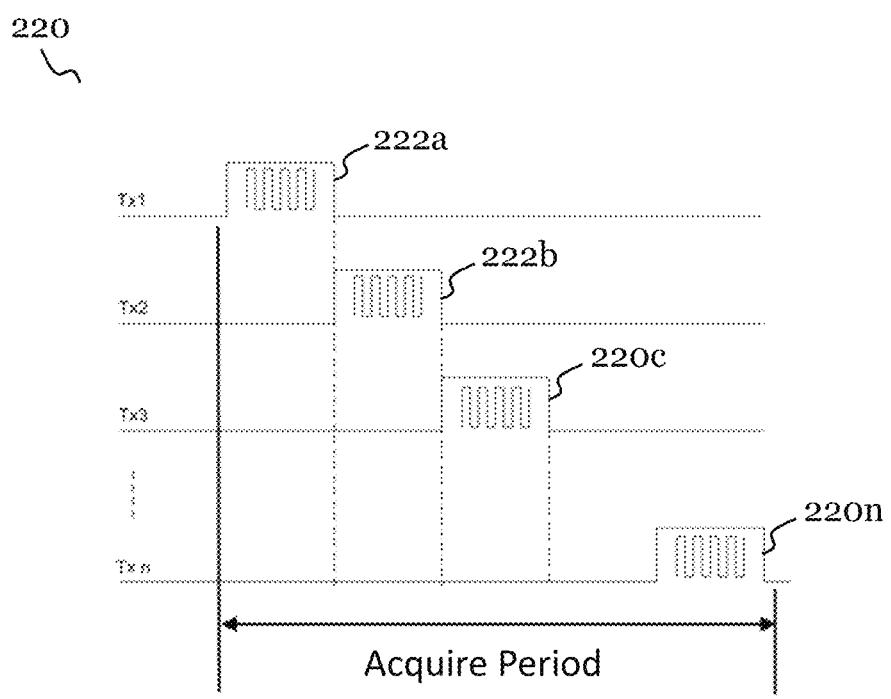
FIG. 2D illustrates a timing diagram of a conventional mutual sampling scan.

FIGS. 2A-2E illustrate schematic views of a conventional electronic device to prevent ghost touches using a noise sampling scan, where FIG. 2A illustrates a schematic view of a conventional electronic device and sampling scans on the electronic device, FIG. 2B illustrates a touch sensing layer during a mutual sampling scan, FIG. 2C illustrates a touch sensing layer during a noise sampling scan, and FIG. 2D illustrates a timing diagram of a conventional mutual sampling scan.

Referring to FIG. 2A, conventionally, an electronic device 100 performs a self-sampling scan 202, a noise sampling scan (or noise scan) 204, and a mutual sampling scan (mutual scan) 206 within a time duration. Each scan is performed in the following order in each portion of the touchscreen: the self-sampling scan 202, the noise sampling scan 204, and the mutual sampling scan 206. Each scan is typically performed at the same portion of the touchscreen as shown, for example, in FIG. 2A.

During the self-sampling scan 202, or self-capacitance scan, the touch controller sequentially measures the self-capacitance of each electrode by applying a known signal and measuring the time it takes for the electrode to charge to a specific voltage. When a finger approaches or touches the touchscreen, the self-capacitance of the nearby electrodes increases.

The noise sampling scan 204 measures environmental noise to create a noise profile used to clean up the data in the mutual sampling scan 206. The mutual sampling scan 206 can use the most recent noise data generated by the noise sampling scan 204 to compensate for noise, for example, noise caused by a zebra image. As understood by those with ordinary skill in the art, when noise is present on the touchscreen 102 and the mutual sampling scan 206 is performed at the same frequency as the noise, the mutual sampling scan may detect a ghost touch on the touchscreen 102.

As described above, because the noise sampling scan 204 is performed at the same portion of the touchscreen 102, when a zebra pattern is displayed but the portion 210 of the touchscreen 102 being sampled does not include the zebra pattern, the frequency selected by the noise sampling scan 204 may not avoid the frequency of the noise caused by the zebra pattern. In other words, even though a zebra image is being displayed on the touchscreen, the portion 210 of the touchscreen 102 being scanned during the noise sampling scan 204 is only displaying white. Because the same portion 210 of the touchscreen 102 is being scanned during the noise sampling scan 204 that is only displaying white, the zebra pattern in the image will not be detected and noise profile will not properly filter the noise during subsequent mutual sampling scans 206.

FIG. 2B illustrates a touch sensing layer 116 for a mutual sampling scan 206. Referring to FIG. 2B, the mutual sampling scan 206 sequentially activate TX channels (transmitter channels or drive lines) TX1, TX2, TXn to measure capacitance changes at intersections with RX channels (receiver channels or sense lines) RX1, RX2, RXn to enable precise multi-touch detection. However, these measurements can be disrupted by environmental noise from power lines, electronics, or the display itself.

FIG. 2C illustrates a touch sensing layer 116 for a noise sampling scan 204. Referring to FIG. 2C, during the noise sampling scan 204, the touch controller sets all TX channels (transmitter channels or drive lines) TX1, TX2, TXn to a high-impedance state or grounds them, effectively silencing the active touch sensing elements. In this state, the sense lines remain active but are solely "listening" to the environment. Any signals detected on these RX channels (receiver channels or sense lines) RX1, RX2, RXn are categorized as noise, which can originate from various sources such as images on the display (i.e., zebra patterns), power supplies, nearby electronic devices, or chargers and USB connections.

By temporarily deactivating all TX channels TX1, TX2, TXn and using RX channels RX1, RX2, RXN to listen to the ambient electrical environment, noise scans 204 create a real-time profile of noise amplitudes and frequencies. The touch controller 104 interleaves these noise scans 204 with mutual scans 206, using the most recent noise profile to clean the mutual capacitance data. It can subtract noise amplitudes in the time domain, use adaptive filters based on the noise profile, or employ frequency-domain techniques like Fourier transforms to isolate and remove specific noise frequencies. This continuous noise compensation allows the mutual sampling scan 206 to operate with lower touch detection thresholds, reducing false touches and enhancing multi-touch accuracy. As the device moves between environments—from a quiet room to a noisy café near a refrigerator, for example—the noise sampling adapts, ensuring that the precision of mutual sampling remains uncompromised.

The touch controller 104 measures the amplitude and frequency characteristics of the noise on each RX channel RX1, RX2, RXn to create a noise profile of the noise data. The noise data between pixels of the touchscreen 102 within the portion 210 of the touchscreen 102 may be sampled at different frequencies. For example, the noise sampling scan 204 may be performed at 225 kHz, at 275 kHz, and 330 kHz. The frequency having the lowest noise data can be selected, and the mutual sampling scan 206 can be performed at that frequency. Other frequencies can be used. Further, more than three frequencies can be used for the noise sampling scan 204.

The noise profile is then used to filter or subtract noise from subsequent mutual sampling scans 206 and self-sampling scans 202, either in the time domain by subtracting noise amplitudes or in the frequency domain using techniques like Fourier transforms to isolate and remove specific noise frequencies. By regularly interspersing noise sampling scans 204 between self-sampling scans 202, the touchscreen adapts in real-time to changing noise environments, ensuring consistent, accurate, and interference-resistant touch performance across diverse settings.

FIG. 2D illustrates a timing diagram 220 of a conventional mutual sampling scan 206. The timing diagram 220 shows the sequentially driven TX channels TX1, TX2, TX3, TXn over an acquire period. For example, TX channel TX1 is driven while TX channels TX2, TX3, TXn are undriven during a first time period 222a, TX channel TX2 is driven while TX channels TX1, TX3, TXn are undriven during a second time period 222b, TX channel TX3 is driven while TX channels TX1, TX2, TXn are undriven during a third time period 222c, and so forth.

Figure 3A:
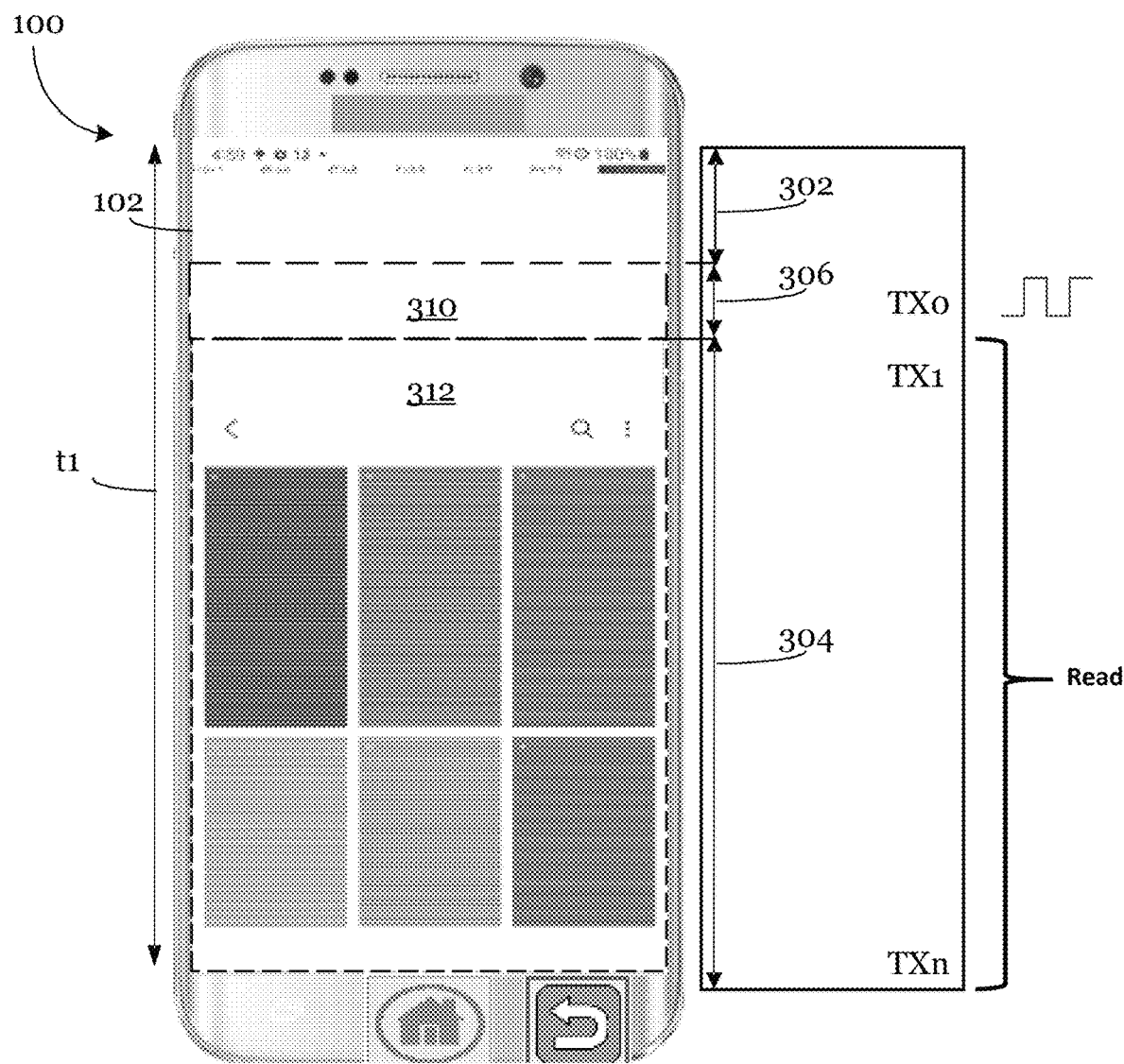
FIGS. 3A-3B illustrate schematic views of an electronic device preventing ghost touches according various embodiments.
Figure 3B:
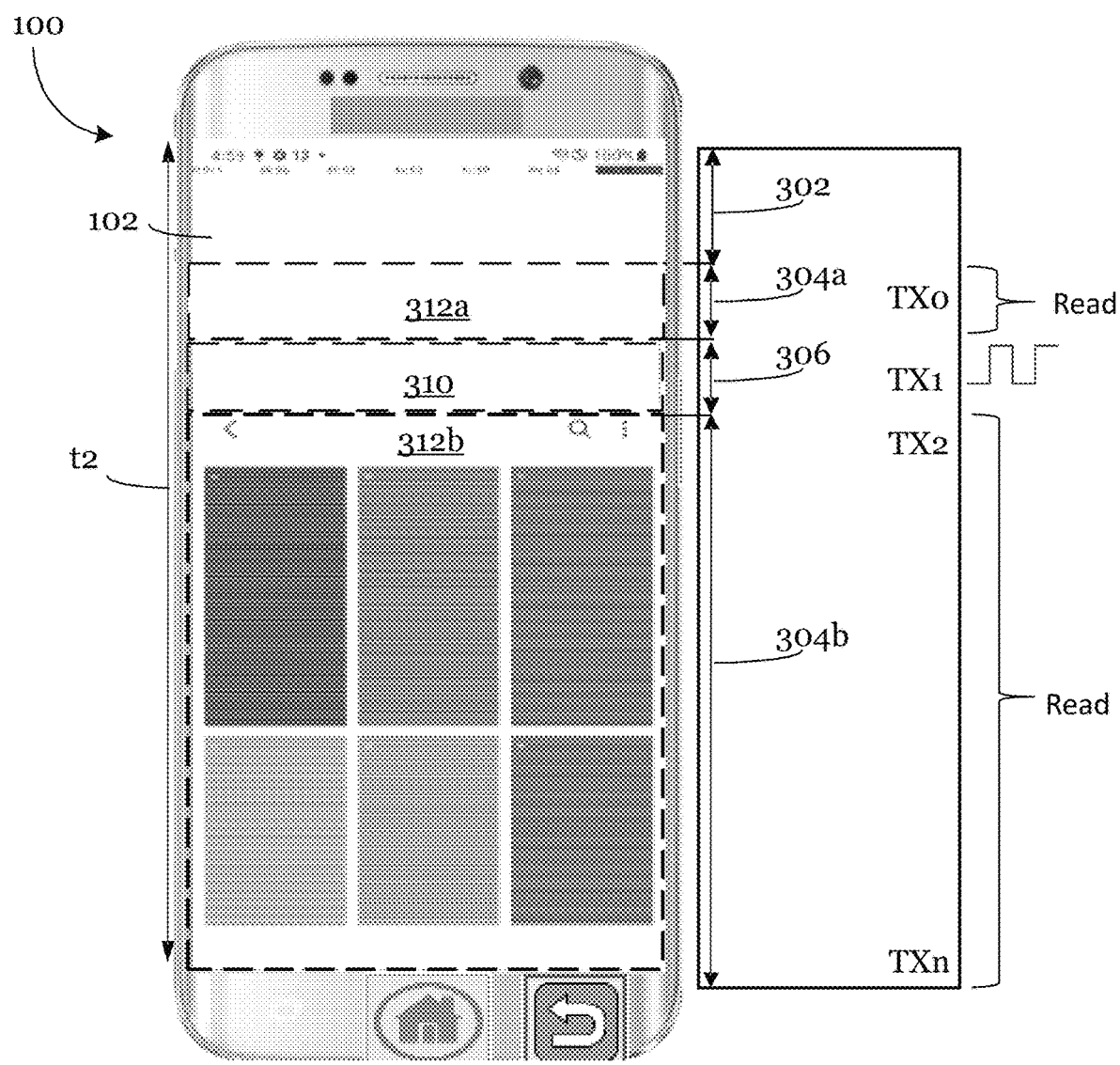

FIGS. 3A-3B illustrate schematic views of an electronic device and corresponding sampling scans to prevent ghost touches. FIG. 3A illustrates a schematic view of an electronic device and sampling scans on the electronic device during a first time period and FIG. 3B illustrates a schematic view of an electronic device and sampling scans on the electronic device during a subsequent time period.

Referring to FIG. 3A, the electronic device 100 performs a self-sampling scan 302, a mutual sampling scan 306, and a noise sampling scan 304 during a first time duration t1 on the touchscreen 102. A complete scan can take 5 ms to 30 ms to complete. For example, the first time duration t1 can be 8 ms in some example embodiments. In other embodiments, other time durations can be implemented.

The self-sampling scan 302, or self-capacitance scan, is performed on a top portion of the touchscreen 102. During the self-sampling scan 302, the touch controller sequentially measures the self-capacitance of each electrode by applying a known signal and measuring the time it takes for the electrode to charge to a specific voltage. When a finger approaches or touches the touchscreen, the self-capacitance of the nearby electrodes increases. The self-sampling scan 302 can take, for example, from 1 ms to 5 ms to complete.

Following the self-sampling scan 302, the mutual sampling scan 306 is performed on a first portion 310 of touchscreen 102. The mutual sampling scan 306 sequentially drives the TX channels to measure capacitance changes. Referring to FIG. 3A, the mutual sampling scan 306 drives a first TX channel TX0 during the first time period t1.

Unlike the conventional electronic device scan, the mutual sampling scan 306 can occur before a noise sampling scan 304. The mutual sampling scan 306 can utilize a predetermined frequency value stored in the memory 110 of the touch controller 104. During the first time duration t1, the predetermined frequency value can be used to set an initial noise profile. The noise profile can be used to filter excess noise detected during the mutual sampling scan 306. By filtering the excess noise, the mutual sampling scan 206 can operate with lower touch detection thresholds, thereby reducing false touches and enhancing touch accuracy.

Following the mutual sampling scan 306, the noise sampling scan 304 is performed on a second portion 312 of touchscreen 102. The noise sampling scan 304 utilizes undriven TX channels, for example TX channels TX1 to TXn, to collect noise data that can be used during subsequent mutual sampling scans. The second portion 312 of the touchscreen 102 can be larger than the first portion 310 of the touchscreen 102. By performing the noise sampling scan 304 over a larger portion of the touchscreen 102, noise on the display, such as zebra patterns, can be captured during the noise sampling scan 304.

The noise data collected from the noise sampling scan 304 can be used to determine a first noise frequency from the second portion 312 of the touchscreen 102. The first noise frequency can be used by the mutual sampling scan to minimize the noise generated from the zebra image. The frequency with the lowest noise value in the noise sampling scan is selected as the first noise frequency and the subsequent mutual sampling scan is performed at the first noise frequency.

Referring to FIG. 3B, the electronic device 300 performs a self-sampling scan 302, a mutual sampling scan 306, a first noise sampling scan 304a, and a second noise sampling scan 304b during a second time duration t2 on the touchscreen 102. During the second time duration t2, the self-sampling scan is performed on a top portion of the touchscreen 102. The mutual sampling scan 306 is performed on a first portion 310 of touchscreen 102 by driving a different TX channel during the second time duration t2. The first noise sampling scan 304a is performed on a first sub-portion 312a of the second portion 312 and the second noise sampling scan 304b is performed on a second sub-portion 312b of the second portion 312 during the second time period.

The scan begins with the self-sampling scan 302. Following the self-sampling scan 302, the first noise sampling scan 304a is performed on a first sub-portion 312a of the second portion 312 of the touchscreen 102. The first noise sampling scan 304a can be performed by the undriven TX channel TX0 on the first sub-portion 312a of the second portion 312 of the touchscreen 102. The first noise sampling scan 304a can also be performed by a first set of undriven TX channels, for example, if the mutual sampling scan 306 is actively driving a TX channel TX10, the first noise sampling scan 304a can be performed by undriven TX channels TX0 to TX9.

Following the first noise sampling scan 304a, the mutual sampling scan 306 is performed on the first portion 310 of the touchscreen 102 by driving the TX channel TX1. The second noise sampling scan 304b can be performed by collecting noise day on the remaining undriven TX channels TX2 to TXn. While FIG. 3B shows the second noise sampling scan 304 being read on TX channels TX2 to TXn, the second noise sampling scan 304b can be performed by a second set of undriven TX channels, for example, if the mutual sampling scan 306 is actively driving a TX channel TX10, the second noise sampling scan 304b can be performed by undriven TX channels TX11 to TXn.

Advantageously, to prevent the occurrence of ghost touches, embodiments of the present application simultaneously perform a mutual sampling scan by driving a TX channel and a noise sampling scan by sensing with the undriven TX channels during each time period. One advantage of this is that noise sampling scans will be performed on different portions of the display, allowing for a zebra image to be detected and frequency hopping to take place preventing ghost touches. Another advantage of this is that the scans can be completed faster since the noise sampling scans do not require additional time to collect the noise data.

Figure 4A:
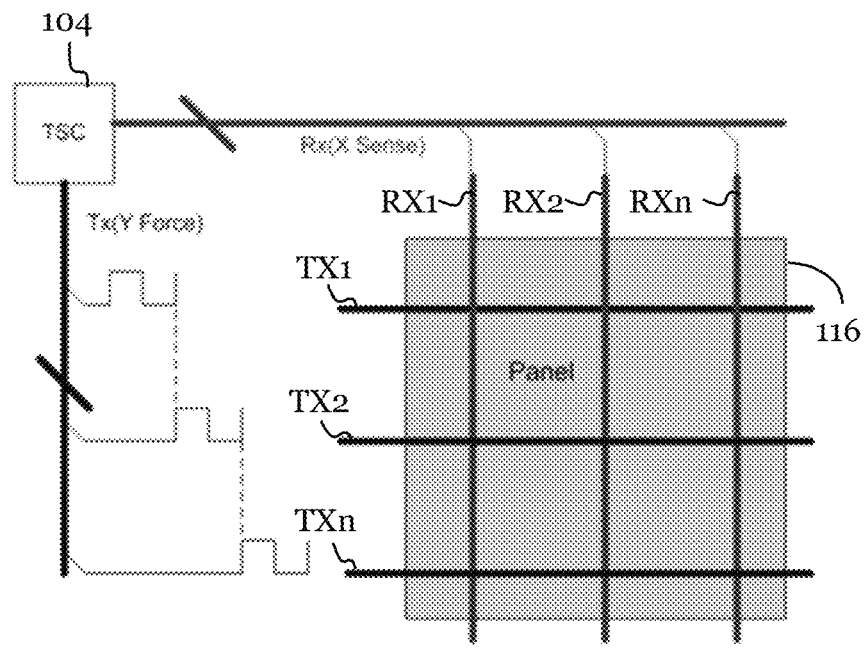
FIG. 4A illustrates schematic views of an electronic device preventing ghost touches according to one embodiment.

FIG. 4A illustrates a touch sensing layer 116 for a noise sampling scan 304 and mutual sampling scan 306. Referring to FIG. 4A, the mutual sampling scan 306 drives the TX channels sequentially, measuring capacitance changes at intersections with RX channels RX1, RX2, RXn to precisely locate multiple touch points. During each time period when the mutual sampling scan 306 is driving a TX channel, the noise sampling scan 304 or noise sampling scans 304a 304b collects noise data by setting the undriven TX channels to a high-impedance state or grounds them and the RX channels remain active to detect signals in the environment. The signals detected on these RX channels RX1, RX2, RXn are categorized as noise to create a noise profile by the touch controller 104.

During the noise sampling scans 304, the touch controller 104 measures existing noise on the touch sensor grid without any touch input. This is done by sampling the capacitive values on the sensor lines (rows and columns) while they are not actively being driven. The noise measurements are used to create a "noise profile" or "noise mask" that represents the current noise across the entire touch sensing layer 116. This noise profile is essentially a map of the noise at different locations on the grid. After obtaining the noise profile, the touch controller 104 performs the mutual sampling scan 306 by driving the sensor lines and measuring the capacitive changes. However, instead of using fixed thresholds for touch detection during the mutual sampling scan 306, the touch controller 104 compares the touch measurements against the previously obtained noise profile.

The touch controller 104 interleaves these noise sampling scans 304 with mutual sampling scans 306, using the most recent noise profile to clean the mutual capacitance data. By subtracting the noise profile from the mutual sampling values, the touch controller 104 can more accurately distinguish true touch events from noise fluctuations. Touch events that exceed the noise by a certain margin (a predetermined threshold) are registered as valid touches, while smaller deviations within the noise profile are ignored or filtered out. By regularly interspersing noise sampling scans 304, the touchscreen adapts in real-time to changing noise environments, ensuring consistent, accurate, and interference-resistant touch performance across diverse settings.

By compensating for noise fluctuations, the touch controller 104 can more reliably detect and locate touch events, reducing false touches or missed touches caused by external noise. Devices using noise sensing can operate more effectively in environments with high levels of electromagnetic interference (EMI) or other noise sources, as the noise is effectively canceled out during touch detection. Since the noise profile is continuously updated, the touch system can adapt to changes in the noise environment, such as the introduction of new noise sources or changes in existing ones.

Figure 4B:
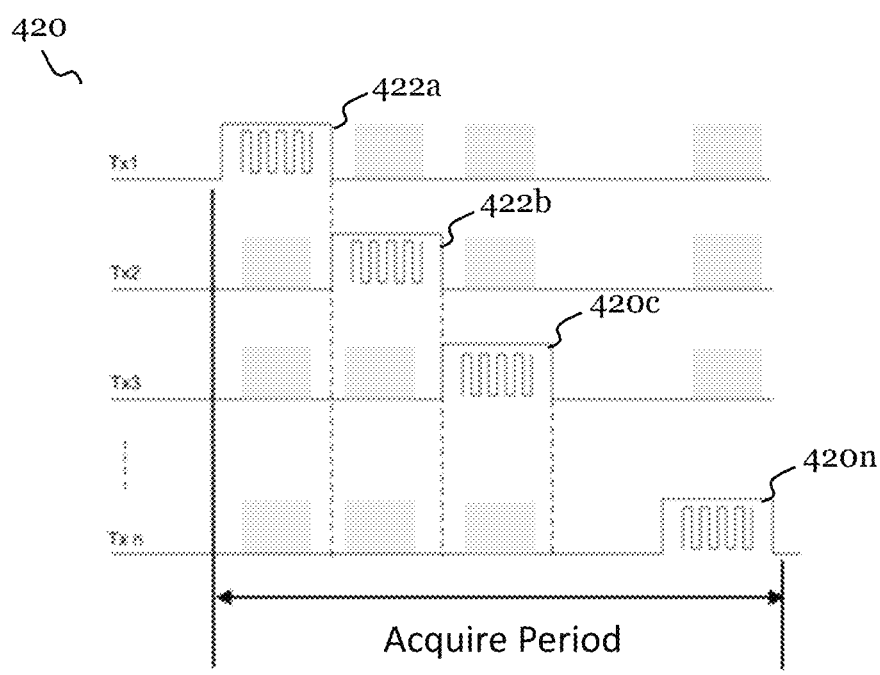
FIG. 4B illustrates a timing diagram of an electronic device preventing ghost touches according to various embodiments.

FIG. 4B illustrates a timing diagram 220 of mutual sampling scans 306 and noise sampling scans 304 over an acquire period. The timing diagram 420 shows the sequentially driven TX channels TX1, TX2, TX3, TXn during the acquire period. For example, TX channel TX1 is driven while TX channels TX2, TX3, TXn are undriven during a first time period 222a, TX channel TX2 is driven while TX channels TX1, TX3, TXn are undriven during a second time period 222b, TX channel TX3 is driven while TX channels TX1, TX2, TXn are undriven during a third time period 222c, TX channel TXn is driven while TX channels TX1, TX2, TX3 are undriven during an nth time period 222n and so forth.

The noise sampling scan 304 is repeated continuously or at regular intervals to account for changes in the noise environment over time. This ensures that the noise profile remains up-to-date and accurately reflects the current noise conditions.

Figure 5:
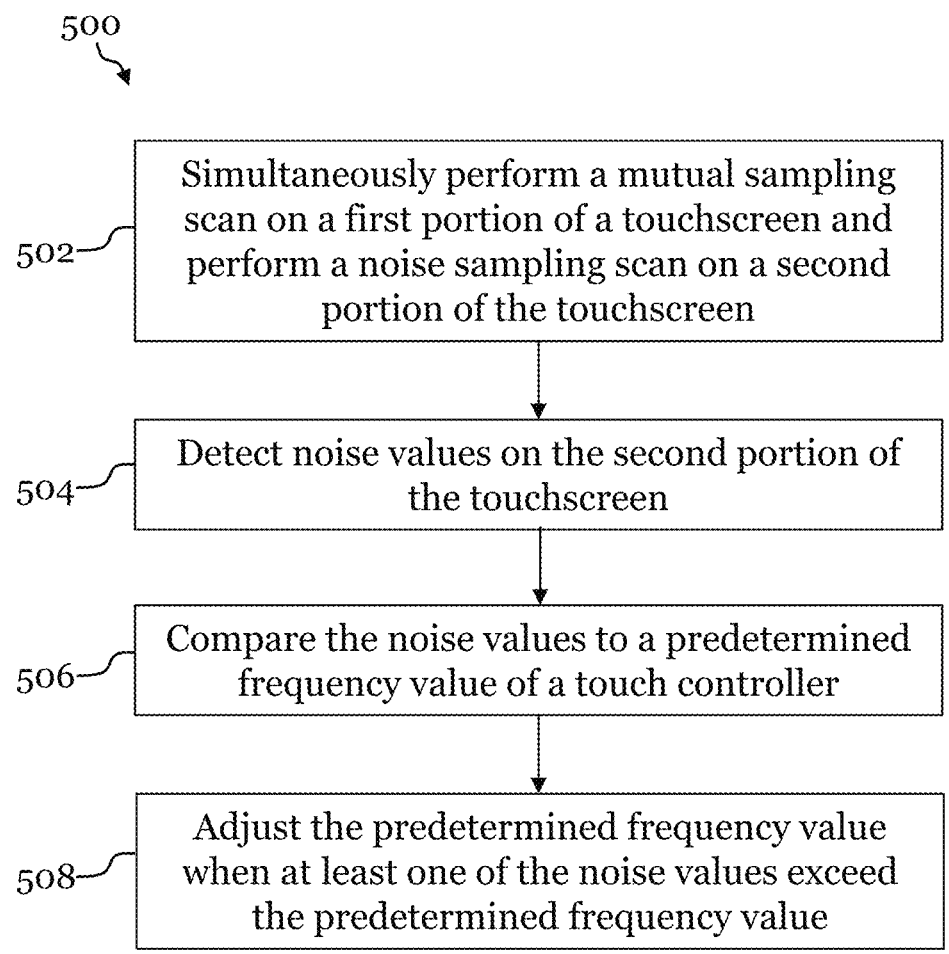
FIG. 5 illustrates a process flow for preventing ghost touches according to an embodiment of the present application.

FIG. 5 illustrates an example process flow 500 for preventing ghost touches according to an embodiment of the present application.

Starting at block 502, and described with reference to FIGS. 3A-3B, a mutual sampling scan 306 and noise sampling scan 304 are simultaneously performed on the touchscreen 102. In various embodiments, the mutual sampling scan 306 is performed on a first portion 310 of a touchscreen and the noise sampling scan 304 is performed on a second portion 312 of the touchscreen. The second portion 312 of the touchscreen 102 can be larger than the first portion 310 of the touchscreen 102. The second portion 312 can include a first sub-portion 312a and a second sub-portion 312b. The first sub-portion 312a and the second sub-portion 312b, collectively, can be larger than the first portion 310 of the touchscreen 102.

The mutual sampling scan 306 is performed by driving a first TX channel of a plurality of TX channels. The noise sampling scan 304 is performed by collecting the noise values by undriven TX channels of the plurality of TX channels.

As next illustrated in block 504, noise values are detected on the second portion 312 of the touchscreen 102. In various embodiments, the noise values are detected on the second portion 312 that is larger than the first portion 310 in order to increase detection of noise images, such as zebra patterns. As shown in FIG. 3A, the first portion 310 of the touchscreen 102 does not display zebra patterns, whereas the second portion 312 of the touchscreen 102 displays several zebra patterns. By apply the noise sampling scan 304 to the second portion 312 that is larger, ghost touches can be prevented when the noise sampling scan 304 is performed where the zebra pattern appears.

As illustrated in block 506, the noise values detected in block 504 are compared to a predetermined frequency value stored in a touch controller 104. The predetermined frequency value sampled by the touch controller 104 are compared to frequencies generated by the noise values.

As illustrated in block 508, the predetermined frequency value stored in the touch controller 104 is adjusted to the frequency that corresponds to higher noise when at least one of the noise values detected in block 504 exceeds the predetermined frequency value. The predetermined frequency value instructs the touch controller 104 to change the predetermined frequency value from a first predetermined frequency setting to a second predetermined frequency setting. The second predetermined frequency setting can be used to perform a subsequent mutual sampling scan.

Figure 6:
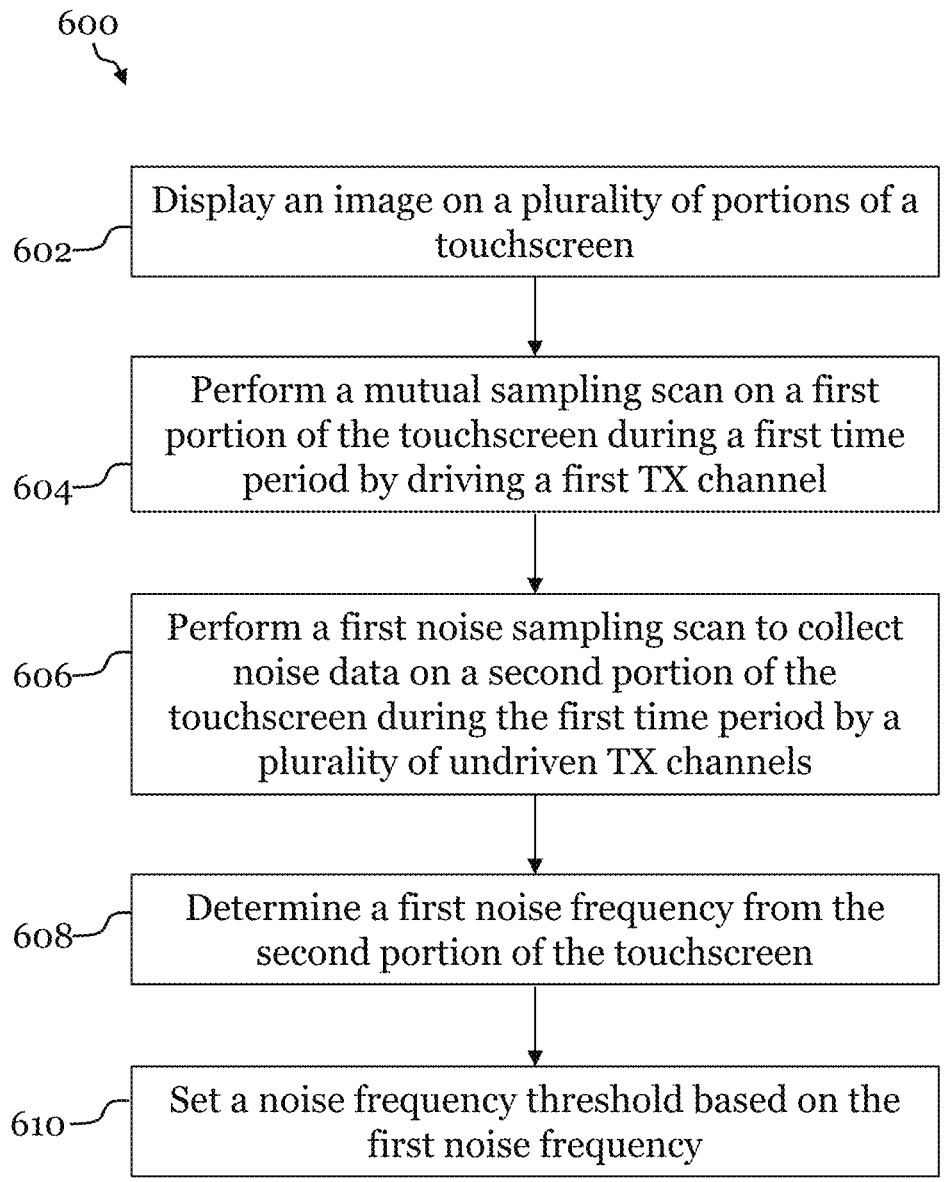
FIG. 6 illustrates a process flow for preventing ghost touches according to an embodiment of the present application.

FIG. 6 illustrates an example process flow 600 for preventing ghost touches according to an embodiment of the present application.

Starting at block 602, and described with reference to FIGS. 3A-3B, an image may be displayed on a touchscreen 102 of an electronic device 100. The touchscreen can include a plurality of portions. For example, the plurality of portions can include a first portion 310 and a second portion 312. The second portion 312 of the touchscreen 102 can be larger than the first portion 310 of the touchscreen 102.

As next illustrated in block 604, a mutual sampling scan 306 is performed on a first portion 310 of the touchscreen during a first time period t1 by driving a first TX channel TX0.

As next illustrated in block 606, a first noise sampling scan 304a is performed to collect noise data on the second portion 312 of the touchscreen during the first time period by a plurality of undriven TX channels. The second portion 312 of the touchscreen can include a first sub-portion 312a and a second sub-portion 312b. The first portion 310 may be positioned between the first sub-portion 312a and the second sub-portion 312b. The first noise sampling scan 304a can be performed to collect noise data on the first sub-portion 312a and a second noise sampling scan 304b can be performed to collect noise data on the second sub-portion 312b.

As next illustrated in block 608, a first noise frequency is determined from the second portion 312 of the touchscreen 102. The first noise frequency corresponds to the noise data collected in block 606.

As next illustrated in block 610, a noise frequency threshold is set based on the first noise frequency determined in block 608. The noise frequency threshold can be used during the mutual sampling scan 306 to prevent ghost touches. When the noise frequency threshold is set to the first noise frequency determined in block 608, the mutual sampling scan 306 can prevent ghost touches when zebra patterns appear on the touchscreen.

Example embodiments of the invention are summarized here. Other embodiments can also be understood from the entirety of the specification as well as the claims filed herein.

Example 1. A method for operating an electronic device, the method includes simultaneously performing a mutual sampling scan on a first portion of a touchscreen and a noise sampling scan on a second portion of the touchscreen, the second portion being larger than the first portion of the touchscreen, detecting noise values from the second portion of the touchscreen, comparing the noise values to a predetermined frequency value of a touch controller, and adjusting the predetermined frequency value when at least one of the noise values exceed the predetermined frequency value.

Example 2. The method of example 1, further including simultaneously performing subsequent mutual sampling scans on the first portion of the touchscreen and subsequent noise sampling scans on the second portion of the touchscreen, where the first portion of the touchscreen changes with each subsequent mutual sampling scan and the second portion of the touchscreen changes with each subsequent noise sampling scan.

Example 3. The method of example 1 or 2, where performing the mutual sampling scan includes driving a first TX channel of a plurality of TX channels and where performing the noise sampling scan includes collecting the noise values by undriven TX channels of a plurality of TX channels.

Example 4. The method of examples 1 to 3, where comparing the noise values includes determining the predetermined frequency value that the touch controller is sampling and comparing the noise values and the predetermined frequency value of the touch controller.

Example 5. The method of examples 1 to 4, further includes increasing touch sensitivity of the touchscreen.

Example 6. The method of examples 1 to 5, where adjusting the predetermined frequency value includes instructing the touch controller to change a first predetermined frequency setting to a second predetermined frequency setting based on the noise values.

Example 7. The method of examples 1 to 6, further including performing a subsequent mutual sampling scan based on the second predetermined frequency.

Example 8. A method for operating an electronic device, the method includes displaying an image on plurality of portions of a touchscreen, the plurality of portions comprising a first portion and a second portion, the second portion being larger than the first portion, performing a mutual sampling scan on the first portion of the display during a first time period by driving a first TX channel, performing a first noise sampling scan to collect noise data on the second portion of the display during the first time period by a plurality of undriven TX channels, determining a first noise frequency from the second portion of the display, and setting a noise frequency threshold based on the first noise frequency.

Example 9. The method of example 8, further including performing a second noise sampling scan on a third portion of the plurality of portions during the first time period, the second noise sampling scan being performed before the mutual sampling scan.

Example 10. The method of examples 8 or 9, where the second portion of the touchscreen includes a first sub-portion and a second sub-portion, the first portion being positioned between the first sub-portion and the second sub-portion.

Example 11. The method of examples 8 to 10, further including: performing a second noise sampling scan and a third noise sampling scan during a second time period, where the second noise sampling scan includes collecting the noise data from a first undriven TX channel on the first sub-portion, and where the third noise sampling scan includes collecting the noise data from a second undriven TX channel on the second sub-portion; determining a second noise frequency from the second portion of the touchscreen; comparing the first noise frequency and the second noise frequency; and adjusting the noise frequency threshold when the second noise frequency exceeds the first noise frequency.

Example 12. The method of example 11, where: the second noise sampling scan includes collecting the noise data from a first plurality of undriven TX channels on the first sub-portion; and the third noise sampling scan includes collecting the noise data from a second plurality of undriven TX channels on the second sub-portion.

Example 13. The method of examples 11 to 12, where: the second noise sampling scan includes collecting the noise data from a first plurality of undriven TX channels on the first sub-portion; and the third noise sampling scan includes collecting the noise data from a single first undriven TX channel on the second sub-portion.

Example 14. A device includes: a display layer including a plurality of pixels; a touch sensing layer adjacent the display layer, the touch sensing layer including a plurality of sensors, each sensor associated with one or more of the pixels; a touch controller; and a non-transitory memory storing a program to be executed by the touch controller, the program including instructions to: simultaneously perform a mutual sampling scan on a first portion of the display layer and performing a noise sampling scan on a second portion of the display layer, the second portion being larger than the first portion of the display layer; detect noise values from the second portion of the display layer; compare the noise values to a predetermined frequency value of the touch controller; and adjust the predetermined frequency value when at least one of the noise values exceed the predetermined frequency value.

Example 15. The device of example 14, where performing the mutual sampling scan comprises driving a first TX channel.

Example 16. The device of examples 14 to 15, where performing the noise sampling scan includes collecting the noise values by undriven TX channels.

Example 17. The device of examples 14 to 16, where comparing the noise values includes determining the predetermined frequency value that the touch controller is sampling and comparing the noise values and the predetermined frequency value of the touch controller.

Example 18. The device of examples 14 to 17, further includes increasing touch sensitivity of the touch sensing layer.

Example 19. The device of examples 14 to 18, where adjusting the predetermined frequency value includes instructing the touch controller to change a first predetermined frequency value to a second predetermined frequency value based on the noise values.

Example 20. The device of examples 14 to 19, further including performing a subsequent mutual sampling scan based on the second predetermined frequency value.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating an electronic device, the method comprising:
    simultaneously performing, during a first time duration, a first mutual sampling scan on a first portion of a touchscreen and a first noise sampling scan on a second portion of the touchscreen, the second portion being larger than the first portion of the touchscreen;
    detecting noise values from the first noise sampling scan on the second portion of the touchscreen;
    comparing the noise values to a noise profile corresponding to a predetermined frequency value of a touch controller;
    adjusting the predetermined frequency value when at least one of the noise values exceed the noise profile corresponding to the predetermined frequency value; and
    simultaneously performing, during a second time duration, a second mutual sampling scan on the first portion of the touchscreen and a second noise sampling scan on the second portion of the touchscreen, wherein the second portion of the touchscreen comprises a first sub-portion and a second sub-portion during the second time duration, the first portion being positioned between the first sub-portion and the second sub-portion during the second time duration.

2. The method of claim 1, further comprising simultaneously performing, after the second time duration, subsequent mutual sampling scans on the first portion of the touchscreen and subsequent noise sampling scans on the second portion of the touchscreen, wherein the position of the first portion of the touchscreen changes with each subsequent mutual sampling scan and the first sub-portion and the second sub-portion of the second portion of the touchscreen change in size with each subsequent noise sampling scan.

3. The method of claim 1, wherein performing the first mutual sampling scan comprises driving a first TX channel of a plurality of TX channels and wherein performing the first noise sampling scan comprises collecting the noise values by undriven TX channels of the plurality of TX channels.

4. The method of claim 1, wherein comparing the noise values comprises determining the predetermined frequency value sampled by the touch controller and comparing the noise values and the noise profile corresponding to the predetermined frequency value of the touch controller.

5. The method of claim 1, further comprising increasing touch sensitivity of the touchscreen.

6. The method of claim 1, wherein adjusting the predetermined frequency value comprises instructing the touch controller to change a first predetermined frequency setting to a second predetermined frequency setting based on the noise values.

7. The method of claim 6, further comprising performing a subsequent mutual sampling scan based on the second predetermined frequency setting.

8. A method for operating an electronic device, the method comprising:
    displaying an image on a plurality of portions of a touchscreen, the plurality of portions comprising a first portion and a second portion, the second portion being larger than the first portion, wherein the second portion of the touchscreen comprises a first sub-portion and a second sub-portion, the first portion being positioned between the first sub-portion and the second sub-portion;

performing a mutual sampling scan on the first portion of the touchscreen during a first time period by driving a first TX channel;
performing a first noise sampling scan to collect noise data on the second portion of the touchscreen during the first time period by a plurality of undriven TX channels;
determining a first noise frequency based on the noise data from the second portion of the touchscreen; and
setting a noise frequency threshold based on the first noise frequency.

9. The method of claim 8, further comprising performing a self-sampling scan on a third portion of the plurality of portions during the first time period, the self-sampling scan being performed before the mutual sampling scan.

10. The method of claim 8, further comprising:
performing a second noise sampling scan and a third noise sampling scan during a second time period, wherein the second noise sampling scan comprises collecting the noise data from a first undriven TX channel on the first sub-portion, and wherein the third noise sampling scan comprises collecting the noise data from a second undriven TX channel on the second sub-portion;
determining a second noise frequency from the second portion of the touchscreen based on the noise data from the first undriven TX channel and the second undriven TX channel during the second time period;
comparing the first noise frequency and the second noise frequency; and
adjusting the noise frequency threshold when the second noise frequency exceeds the first noise frequency.

11. The method of claim 10, wherein:
the second noise sampling scan comprises collecting the noise data from a first plurality of undriven TX channels on the first sub-portion; and
the third noise sampling scan comprises collecting the noise data from a second plurality of undriven TX channels on the second sub-portion.

12. The method of claim 10, wherein:
the second noise sampling scan comprises collecting the noise data from a plurality of undriven TX channels on the first sub-portion; and
the third noise sampling scan comprises collecting the noise data from a single undriven TX channel on the second sub-portion.

13. A device comprising:
a display layer comprising a plurality of pixels;
a touch sensing layer adjacent the display layer, the touch sensing layer comprising a plurality of sensors, each sensor associated with one or more of the pixels;
a touch controller; and
a non-transitory memory storing a program to be executed by the touch controller, the program comprising instructions to:
simultaneously perform, during a first time period, a first mutual sampling scan on a first portion of the touch sensing layer and a first noise sampling scan on a second portion of the touch sensing layer, the second portion being larger than the first portion of the touch sensing layer;
detect noise values from the first noise sampling scan on the second portion of the touch sensing layer;
compare the noise values to a noise profile corresponding to a predetermined frequency value of the touch controller;
adjust the predetermined frequency value when at least one of the noise values exceed the noise profile corresponding to the predetermined frequency value; and
simultaneously perform, during a second time period, a second mutual sampling scan on the first portion of the touch sensing layer and a second noise sampling scan on the second portion of the touch sensing layer, wherein the second portion of the touch sensing layer comprises a first sub-portion and a second sub-portion during the second time period, the first portion being positioned between the first sub-portion and the second sub-portion during the second time period.

14. The device of claim 13, wherein the instruction to perform the first mutual sampling scan causes the touch controller to drive a first TX channel.

15. The device of claim 14, wherein the instructions to perform the first and second noise sampling scans cause the touch controller to collect the noise values by undriven TX channels.

16. The device of claim 13, wherein the instruction to compare the noise values comprises instructions to determine the predetermined frequency value of the touch controller and compare the noise values and the noise profile corresponding to the predetermined frequency value of the touch controller.

17. The device of claim 13, wherein the program further comprises instructions to increase touch sensitivity of the touch sensing layer.

18. The device of claim 13, wherein the instruction to adjust the predetermined frequency value causes the touch controller to change a first predetermined frequency value to a second predetermined frequency value based on the noise values.

19. The device of claim 18, wherein the program further comprises instructions to perform a subsequent mutual sampling scan based on the second predetermined frequency value.

20. The device of claim 13, wherein the instruction to perform the second mutual sampling scan causes the touch controller to drive a second TX channel.

* * * * *